(12) United States Patent
Holey et al.

(10) Patent No.: US 12,417,181 B1
(45) Date of Patent: Sep. 16, 2025

(54) SYSTEMS AND METHODS FOR APERTURE-SPECIFIC CACHE OPERATIONS

(71) Applicant: NVIDIA Corporation, Santa Clara, CA (US)

(72) Inventors: Anup Holey, San Jose, CA (US); Wishwesh Anil Gandhi, Sunnyvale, CA (US); Sujoyita Kaushikkar, San Jose, CA (US); Karan Mehra, Apex, NC (US); Daniel Glenn Robinson, Cary, NC (US); Sami Olavi Johannes Kiminki, Espoo (FI); Alexander Michael Waterman, Westlake Hills, TX (US); Mark Hairgrove, San Jose, CA (US); Jeff Smith, Barrington, RI (US); Liang Yin, Palo Alto, CA (US)

(73) Assignee: NVIDIA Corporation, Santa Clara, CA (US)

(*) Notice: Subject to any disclaimer, the term of this patent is extended or adjusted under 35 U.S.C. 154(b) by 0 days.

(21) Appl. No.: 18/665,392

(22) Filed: May 15, 2024

Related U.S. Application Data

(60) Provisional application No. 63/566,142, filed on Mar. 15, 2024.

(51) Int. Cl.
   *G06F 12/0815* (2016.01)

(52) U.S. Cl.
   CPC .................. *G06F 12/0815* (2013.01)

(58) Field of Classification Search
   None
   See application file for complete search history.

(56) References Cited

U.S. PATENT DOCUMENTS

| | | | |
|---|---|---|---|
| 11,880,327 B1* | 1/2024 | Nakibly | G06F 13/4027 |
| 2014/0049551 A1* | 2/2014 | Rao | G06T 1/20 |
| | | | 345/543 |
| 2018/0293362 A1* | 10/2018 | Ray | H04N 19/00 |
| 2018/0293693 A1* | 10/2018 | Ray | G06F 12/0815 |
| 2020/0089611 A1* | 3/2020 | Gandhi | G06F 12/0808 |
| 2020/0192799 A1* | 6/2020 | Johns | G06F 12/1009 |

\* cited by examiner

*Primary Examiner* — Kaushikkumar M Patel
(74) *Attorney, Agent, or Firm* — Lowenstein Sandler LLP

(57) ABSTRACT

A processing device including a first cache is coupled to a system memory and a parallel processing unit (PPU) including a second cache. An operation to modify cache lines of the second cache associated with a first aperture of the system memory is received. A first subset of cache lines of the second cache is identified. The first subset of cache lines is associated with the first aperture of the system memory and is different from a second subset of cache lines of a second aperture of the system memory. The first subset of cache lines is modified as specified by the cache operation.

20 Claims, 10 Drawing Sheets

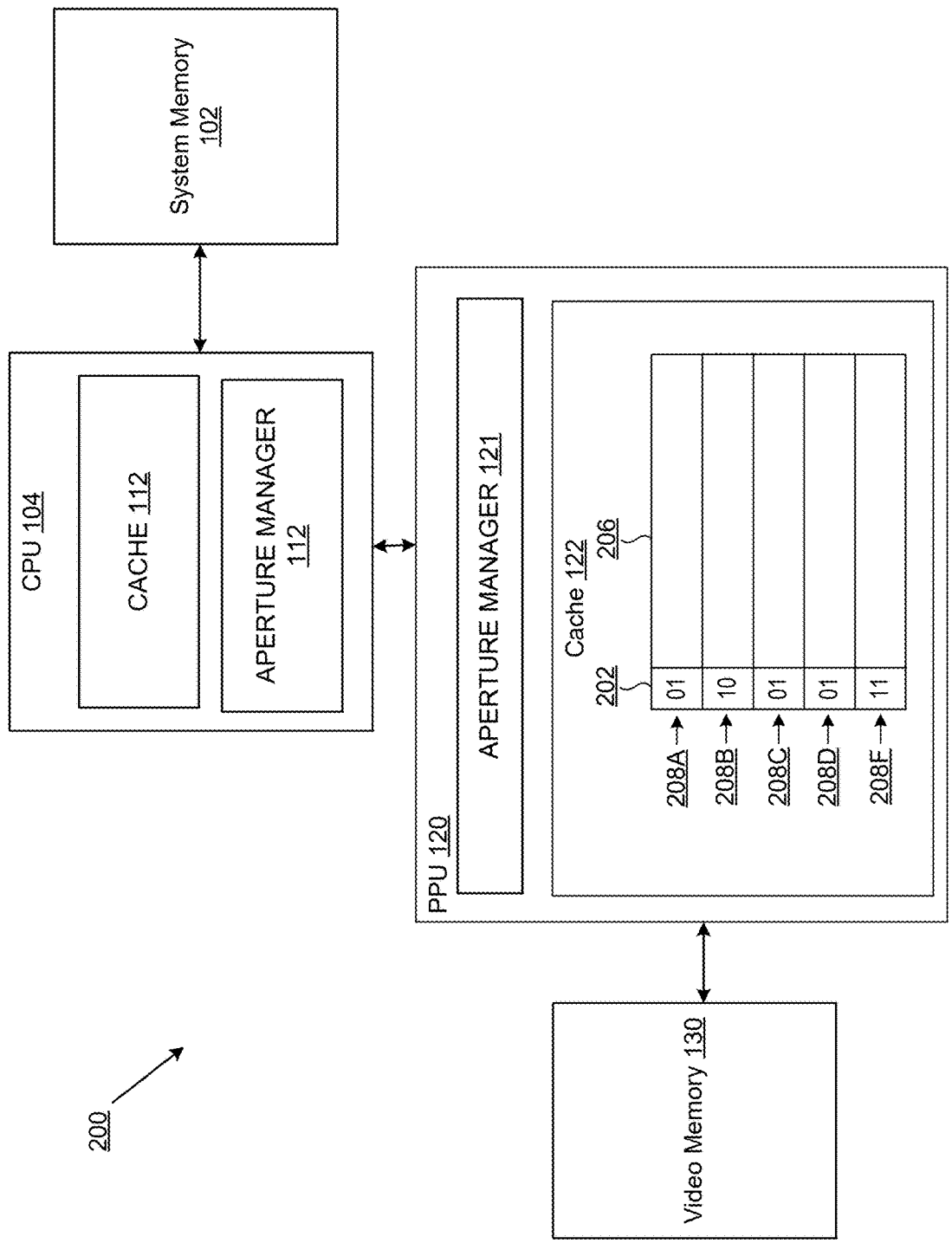

300

Receive, at a parallel processing unit (PPU) including a first cache, a cache operation to modify cache lines of the first cache associated with a first aperture of a system memory of a processing device
302

↓

Identify a first subset of cache lines of the first cache, where the first subset of cache lines is associated with a first aperture of the system memory
304

↓

Identify a second subset of cache lines of the first cache, where the second subset of cache lines is associated with a second aperture of the system memory
306

↓

Modify the first subset of cache lines as specified by the cache operation.
308

SYSTEMS AND METHODS FOR APERTURE-SPECIFIC CACHE OPERATIONS

RELATED APPLICATIONS

This application claims the benefit of U.S. Provisional Patent Application No. 63/566,142 filed Mar. 15, 2024, the entire contents of which are incorporated by reference herein.

FIELD OF THE INVENTION

Embodiments of the present disclosure generally relate to parallel processing systems. Specifically, embodiments of the present disclosure relate to parallel processing systems and methods for aperture-specific cache operations.

BACKGROUND

Parallel processing in high-performance computing (HPC) systems involves the simultaneous execution of multiple computational tasks or operations. This is done by breaking down larger computations into smaller, independent subtasks that may be processed concurrently by multiprocessors. In some instances, parallel processing involves distributed computing such that task are distributed across multiple computing clusters. Each cluster may operate independently, and communication can be facilitated to share results.

BRIEF DESCRIPTION OF THE DRAWINGS

FIG. 2 is a diagram illustrating an aperture-specific cache coherency system, in accordance with at least one embodiment of the present disclosure.

FIG. 3 illustrates a flowchart of a method for aperture-specific cache operations, in accordance with at least one embodiment of the present disclosure.

DETAILED DESCRIPTION

Figure 1:
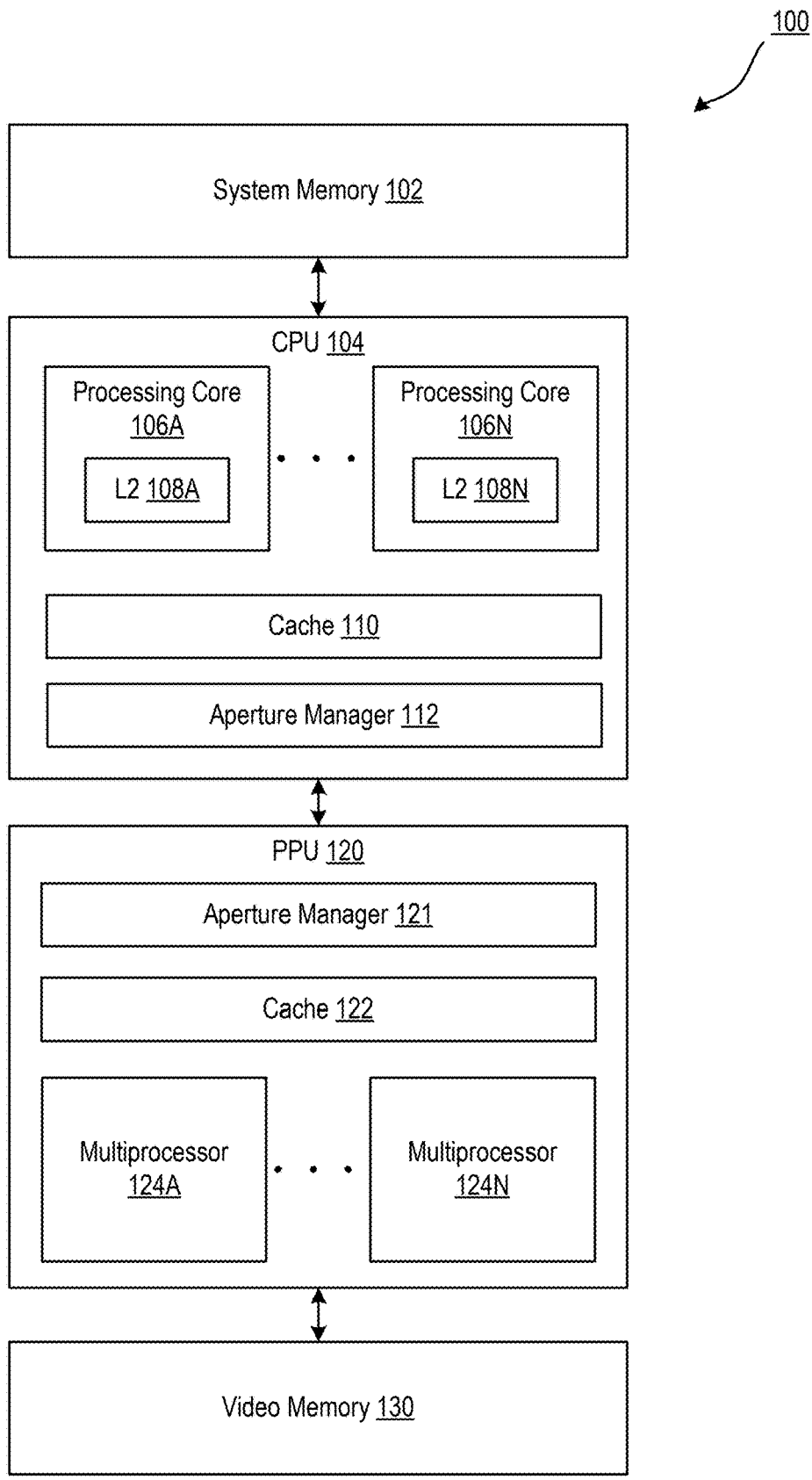
FIG. 1 is a block diagram illustrating a computer system configured to implement one or more aspects of the present disclosures.

High Performance Computing (HPC) systems may use specialized hardware architectures, such as parallel processing units (PPUs), to enhance parallel processing abilities. PPUs are designed to extract high performance using a large number of small, parallel execution threads on dedicated programmable multiprocessors. In PPUs, a group of threads, such as a warp, may execute the same instruction concurrently on a multiprocessor with different input data. This execution model is referred to as Single Instruction, Multiple Thread (SIMT) and is commonly utilized in parallel computing. PPUs are designed to execute a program (e.g., a kernel, a shader program, etc.) in parallel by executing many groups of threads on the PPU in which each thread of the groups of threads typically operates on a different portion of data. Because PPU architectures are generally optimized for executing many parallel threads simultaneously, PPUs, such a graphical processing units (GPUs), are leveraged to accelerate artificial intelligence (AI), HPC, cloud, and hyperscale workloads. Particularly, AI models are rapidly increasing in complexity and size as they enhance deep recommender systems containing large (e.g., 10 terabytes or more) amounts of data.

System architectures are emerging with fast access to memory enabled by a tight coupling of the central processing unit (CPU) and PPU via high-bandwidth interconnects, such as high-speed busses or specialized on-chip communication channels. Notably, bidirectional, high-bandwidth, and cache-coherent connections between CPU and PPU memory allow multiple application threads (CPU or PPU) to directly access system-allocated memory. For example, a PPU can cache system memory associated with and owned by the CPU within internal PPU caches. Similarly, the CPU can cache video memory associated with and owned by the PPU within internal CPU caches. Some conventional system may maintain coherency between GPU caches (e.g., L1, L2, L3, etc.) and CPU caches (e.g., L0, L1, L2, system level cache (SLC)) by software through explicit cache flushes and invalidates. For example, the CPU may allocate a portion of system memory and designate it as a buffer that the PPU can use for processing. When the PPU finishes its work on the buffer, there may be some data modified by the PPU associated with an address that belongs to the CPU's system memory but is known to the CPU. A software mechanism can ensure that the PPU has written out all of its data to the CPU cache before control of the buffer transfers back to the CPU. Cache invalidates may be carried out on the entire GPU cache such that every cache line associated with system memory is written back to the CPU cache and invalidated. This process can take many (e.g., thousands) of cycles and add latency between a GPU-CPU handshake. Such latency can hamper performance and reliability in latency sensitive systems such as Advanced Driver Assistance Systems (ADAS) and Automated Driving Systems (ADS).

To avoid issues associated with software-managed CPU-GPU coherency, some conventional systems may utilize hardware coherency between GPU and CPU caches using a coherent memory interconnect with native hardware support. For example, chip-to-chip (C2C) hardware-coherency may enable a GPU to cache system memory within a cache at cache-line granularity without page migrations between system memory and video memory. Hardware coherence can simplify and speed up CPU-GPU communication for data closely shared between the CPU and the PPU. This hardware coherency can improve performance of memory accesses to non-local memory, such a CPU thread accessing GPU memory (e.g., video memory) or a GPU thread accessing CPU memory (e.g., system memory). Hardware managed coherence simplifies the programming model as explicit software coherence is not used. For example, if a cache line is modified in a GPU cache, the CPU may receive an indication that the cache line has been modified and may retrieve associated data from the GPU when it is needed by the CPU. As such, explicit flushes and invalidates of GPU hardware coherent data may not be needed. However, coherently caching system memory buffers that may only be accessed by the PPU may incur needless overhead associated with hardware coherency as the CPU may never need access to data stored in such memory buffers.

Aspects and implementations of the present disclosure address the above deficiencies and other deficiencies of conventional cache coherences systems by providing aperture-specific cache management operations for cache coherency. To enable memory sharing between a CPU and a PPU, the CPU may designate apertures associated with shared memory devices. An aperture is a portion of the address space that is persistently associated with a particular peripheral device or a memory unit. Apertures may reach external devices such as Read-Only Memory (ROM) or Random-Access Memory (RAM) chips, or internal memory on the CPU itself. For example, a memory device included in the system may begin addressing starting at zero. However, because the system has more than one memory device (e.g., system memory, video memory, etc.) with the same addressing scheme, the system may have ambiguous addressing. To resolve this, the system may designate multiple apertures, each associated with a memory device of the system. Thus, apertures form a layer of address translation below the level of virtual-physical mapping. For example, when a buffer is allocated in system memory for use by the PPU, the buffer may be designated as a system memory aperture. When a buffer is allocated in video memory, the buffer may be designated as a video memory aperture.

In at least one embodiment, the system may maintain a logical distinction between non-coherent system memory aperture buffers and coherent system memory aperture buffers within the same system memory. Buffers designated as non-coherent system memory aperture buffers can include system memory buffers that the system expects only the PPU to access such as a game buffers, textures, compressible surfaces, and the like. Buffers designated as coherent system memory aperture buffers can include system memory buffers associated with workload sharing dispatched to the PPU that the system expects the CPU to access. When a system memory buffer is created, the system memory buffer can be designated as a non-coherent aperture buffer or a coherent aperture buffer. For example, if the buffer is regularly used to communicate between the CPU and the PPU, the buffer may be designated as a coherent system memory aperture buffer. If the buffer is expected to be used by the PPU and not the CPU, the buffer may be designated as a non-coherent system memory aperture buffer.

In at least one embodiment, cache coherency can be managed based on aperture designations. Buffers designated as coherent system memory aperture buffers may be coherently cached according to hardware-managed coherence techniques. Coherency of buffers designated as non-coherent system memory aperture buffers may be managed using aperture-specific cache operations. In at least one embodiment, coherency of buffers designated as non-coherent memory aperture buffers may be managed through explicit cache flushes and invalidates. For example, before control of non-coherent memory buffer transfers from the PPU back to the CPU, a cache operation can be issued to flush and/or invalidate all cache lines designated as a non-coherent system memory cache lines. The PPU can compare aperture identifiers in aperture fields of each cache line its cache and invalidate cache lines designated as non-coherent system memory aperture cache lines. Non-coherent system memory cache lines in one or more caches associated with the PPU can accordingly be flushed, written back to system memory, and invalidated. To invalidate cache lines, the PPU can writeback associated data back to CPU caches, mark the cache lines as invalid, and discard the cache lines. To flush cache lines, the PPU can writeback associated data back to CPU caches, and maintain the cache lines in a clean state for future reuse. It is appreciated that aperture-specific invalidate and flush cache operations are used herein by way of example, and not by way of limitation, noting that other cache operations can target aperture-specific cache lines.

Advantages of the technology disclosure herein include, but are not limited, decreased destructive interference between coherent and non-coherent system memory cache lines. Specifically, by targeting specific aperture cache lines, latency associated with invalidating PPU cache lines can be reduced as fewer cache lines are targeted. Additionally, coherent system memory aperture cache lines that are critical to performance and are not associated with applications issuing non-coherent system memory aperture cache invalidates may be maintained within the cache and managed by hardware coherency techniques.

FIG. 1 is a block diagram illustrating a computer system 100 configured to implement one or more aspects of the present disclosure. The system 100 includes a system memory 102 and a central processing unit (CPU) 104 that may communicate via an interconnection pathway such as a bus, a dedicated memory bridge, or other communication path. A parallel processing unit (PPU) 120 is operatively coupled to the CPU 104 via a communication path such as a system bus, a Peripheral Component Interconnect express (PCIe), a Northbridge/Southbridge architecture, or other communication path. In at least one embodiment, the PPU 120 may be integrated directly onto the CPU 104 die and communication may be handled internally within the CPU 104. In yet another embodiment, the PPU 120 may be integrated with one or more other system elements, such as the CPU 104 and the system memory 102 to form a system on a chip (SoC). In such an embodiment, the CPU 104, the PPU 120, and other components of the system 100 may communicate using an architecture-specific common interface, such as an Advanced Reduced Instruction Set Computer (RISC) Machine (ARM) Common Hardware Interface (CHI) or a specialized Chip-to-Chip (C2C) interface.

In at least one embodiment, the PPU 120 may incorporate circuitry optimized for graphics and video processing, including, for example, video output circuitry, and constitutes a graphics processing unit (GPU). In another embodiment, the PPU 120 incorporates circuitry optimizes for general purpose processing, while preserving the underlying computational architecture. The system 100 further includes a video memory (VMEM) 130 that the PPU 120 may use to store necessary data such as textures, frame buffers, shaders, and other graphical elements. In at least one embodiment, the VMEM 130 can include various types of memory devices, included dynamic random-access memory (DRAM) or graphics random-access memory such as video random-access memory (VRAM) or synchronous graphics random-access memory (SGRAM), including graphics double data rate (GDDR) SGRAM. In at least one embodiment, the VMEM 130 can include one or more stacks of memory, such as multiple DRAM dies stacked vertically, to form a high bandwidth memory (HBM). It is appreciated that the specific implementation of VMEM 130 can vary and can be selected from one of many available designs.

The PPU 120 may include one or more multiprocessor(s) 124A through 124N (referred to generally as a multiprocessor(s) 124, herein) and a cache 122. Each multiprocessor 124, for example, may be a streaming multiprocessor (SM), a compute unit (CU), a many integrated core (MIC), and the like. Each multiprocessor 124 may be responsible for executing parallel processing tasks, which involve performing the same operation on multiple pieces of data concurrently. Each multiprocessor 124 can execute a certain number of threads simultaneously such that the PPU 120, as a whole, can execute a large number of threads concurrently across all multiprocessors 124. Each multiprocessor 124 may include an L1 cache (not shown) or use a corresponding L1 cache outside of the multiprocessor 124 that is used to perform load and store operations. Each multiprocessor 124 may have access to the cache 122 that is shared among all multiprocessors 124 and may be used to transfer data between threads. The cache 122 may be arranged along any level of a cache hierarchy (e.g., L1, L2, L3, etc.). In at least one embodiment, the cache 122 can be a shared memory (e.g., a local memory) that can behave as a programmable cache shared among threads. Each multiprocessor 124 may also have access to global memory, which can include, for example, system memory 102 and/or VMEM 130.

The CPU 104 can include one or more processing cores 106A through 106N (referred to generally as "processing cores 106" herein) and a cache 110. Each of the processing cores 106 may be individual processing units within the CPU 104 that independently execute instructions. Each processing core 106 may be a complete processing unit with its own arithmetic logic units (ALUs), control units, registers, and other components necessary to execute program instructions. Each processing core 106 may have dedicated cache (e.g., L1, L2, etc.) and may further have access to the cache 110. In at least one embodiment, the cache 110 may be a shared cache such as an L3 cache, an L4 cache, a system level cache (SLC), etc. Each processing core 160 can additionally have access to global memory, such as system memory 102.

It is appreciated that the system 100 illustrated herein is illustrative and that variations and modifications are possible. The connection topology, the number of CPUs 104, the number of PPUs 120, the number of processing cores 106 within the CPU 104, and the number of multiprocessors 124 within the PPU 120 may be modified as desired. Additionally, the particular components illustrated herein are not exhaustive; for example, any number of add-in cards, peripheral devices, switches, network adapters, and the like might be supported but are not illustrated herein.

In at least one embodiment, the PPU 120 is a graphics processor with rendering pipelines that can be configured to perform various tasks related to generated pixel data from graphics data supplied by CPU 104 and/or system memory. In operation, the CPU 104 is the central processor of computer system 100, controlling and coordinating operations of other system components. In particular, the CPU 104 may issue commands that control the operation of PPU 120.

In at least one embodiment, the CPU 104 and the PPU 120 may be tightly coupled such that CPU 104 and the PPU 120 can share system memory 102 and VMEM 130. The system 100 can include high-bandwidth interconnects, such as high-speed busses or on-chip communication channels, e.g., ARM CHI. Such a design is aimed at achieving efficient collaboration between the CPU 104 and PPU 120 for parallel processing tasks, such as graphics rendering or general-purpose computing.

In some instances, the CPU may offload specific computational tasks from the CPU to the PPU, for example, to take advantage of parallel processing capabilities of the GPU such as graphics rendering, simulations, machine learning, and the like. Responsive to identifying specific tasks within a program suitable for execution on the PPU, the CPU may share relevant data stored in system memory 102 with the PPU 120. For example, CPU 104 can set aside a memory block, such as a buffer, in system memory 102 for PPU 120 to use.

In at least one embodiment, address translation service (ATS) can allow the CPU 104 and the PPU 120 to share one or more per-process page tables which enable both CPU 104 threads and PPU 120 threads to access system-allocated memory residing in physical memory such as system memory 102 or VMEM 130. For example, chip-to-chip (C2C) hardware-coherency may enable PPU 120 to cache system memory 102 buffers within the cache 122 at cache-line granularity without page migrations between system memory 102 and VMEM 130. Hardware coherence can simplify and speed up CPU-GPU communication for data (referred to as "coherent data" or "coherent buffers" herein) closely shared between the CPU 104 and the PPU 120. In at least one embodiment, the system 100 may include a hardware interface protocol using a directory-based system for hardware cache coherency between CPU 104 caches and PPU 120 caches. For example, the directory-based protocol may include several states for each cache line, such as Modified (M), Exclusive (E), Shared (S), and Invalid (I). However, coherently caching certain system memory buffers (referred to as "non-coherent data" or "non-coherent buffers" herein) that are only be accessed by the PPU 120 may incur needless overhead associated with hardware coherency. Accordingly, an aperture manager 112 of the CPU 104 and/or an aperture manager 121 of the PPU 120 may issue aperture-specific cache operations to manage sharing of non-coherent system memory buffers.

The aperture managers 112 and 121 may be software component of a software sequence for managing communication between the CPU 104 and PPU 120. The software sequence can include an application programming interface (API), device initialization, memory allocation, data transfer between CPU 104 and PPU 120, kernel compilation and execution, CPU-GPU coherency, and the like. Specifically, the aperture manager 112 may enable sharing of non-coherent system memory buffers between the CPU 104 and PPU 120. To enable memory sharing, the aperture manager 112 may designate apertures associated with shared memory devices. An aperture is a portion of the address space that is persistently associated with a particular peripheral device or a memory unit. Apertures may reach external devices such as Read-Only Memory (ROM) or Random-Access Memory (RAM) chips, or internal memory on the CPU 104 itself. For example, a memory device included in the system 100 may address starting at zero. However, because the system 100 has more than one memory device (e.g., system memory 102, VMEM 130, etc.), the system 100 would have ambiguous addressing. To resolve this, aperture manager 112 may designate one of multiple apertures when a buffer is allocated from a memory device. For example, when a buffer is allocated in system memory 102, the aperture manager 112 may designate the buffer as a system memory aperture. When a buffer is allocated in VMEM 130, the aperture manager 112 may designate the buffer as a video memory aperture.

In at least one embodiment, the aperture manager 112 may maintain a distinction between a non-coherent system memory aperture and a coherent system memory aperture. Buffers designated as non-coherent system memory apertures can include system memory buffers that only the PPU 120 may access such as a game buffers, textures, compressible surfaces, and the like. Buffers designated as coherent system memory aperture buffers can include system memory buffers associated with workload sharing dispatch to the PPU 120. When a system memory buffer is created, the aperture manager 112 can designate the buffer as a non-coherent system memory aperture or a coherent system memory aperture. For example, the aperture manager 112 may designate buffers regularly used to communicate between the CPU 104 and the PPU 120 as coherent system memory aperture buffers. The aperture manager 112 may designate buffers including data used by the PPU 120, and not the CPU 104, as a non-coherent system memory aperture buffers.

In at least one embodiment, cache coherency can be managed based on aperture designations. Buffers designated as coherent system memory apertures may be coherently cached in the cache 122 according to hardware-managed coherency techniques described above. Coherency of buffers designated as non-coherent system memory aperture buffers may be managed using aperture-specific cache operations. In at least one embodiment, coherency of buffers designated as non-coherent memory aperture buffers may be maintained by the aperture manager 121 of the PPU 120 through explicit cache flushes and invalidates. For example, before control of non-coherent memory buffer transfers from the PPU 120 back to the CPU 104, the aperture manager 121 may issue a cache-management operations to the cache 122 to flush and/or invalidate all cache lines associated with a non-coherent system memory aperture. Responsive to receiving such a cache operation, The PPU 120 can compare fields in each cache line of the cache 122 corresponding to aperture identifiers and selectively flush and/or invalidate cache lines associated with a non-coherent system memory aperture. Non-coherent system memory cache lines in the cache 122 can accordingly be flushed from the cache, written back to system memory 102 and/or one or more CPU 104 caches, and invalidated.

FIG. 2 is a diagram 200 illustrating an aperture-specific cache coherency system, in accordance with at least one embodiment of the present disclosure. Diagram 200 may include similar elements illustrated by computing system 100, as described with respect to FIG. 1. It can be noted that elements of FIG. 1 can be used herein to help describe FIG. 2. The operations described with respect to FIG. 2 are described to be performed serially for the sake of illustration, rather than limitation. Although shown in a particular sequence or order, unless otherwise specified, the order of operations can be modified. Thus, the illustrated embodiments should be understood only as examples, and the described operations can be performed in a different order, while some operations can be performed in parallel. Additionally, one or more operations may be omitted in some embodiments. Thus, not all described operations are required in every embodiment, and other process flows are possible. In some embodiments, the same, different, fewer, or greater operations may be performed. Diagram 200 illustrates a technique that utilizes memory aperture buffer designations as part of a cache coherency technique. The diagram 200 illustrates a CPU 104 including a cache 122 and an aperture manager 112, a system memory associated with the CPU 104, a PPU 120 including a cache 122, an aperture manager 121, and a VMEM 130 associated with the PPU 120.

The cache 122 may be configured to cache data stored at system memory 102 and/or VMEM 130. In at least one embodiment, the CPU 104 may allocate a buffer in system memory 102 to be processed by the aperture manager 112. The size of the allocated system memory buffer can depend on the amount of data to be processed by the PPU 120. The CPU 104 may populate the system memory buffer with necessary data and transfer the buffer from the CPU 104 to the PPU 120. In at least one embodiment, prior to transferring the system memory buffer to the PPU 120, the aperture manager 112 can designate an aperture associated with the system memory. In at least one embodiment, the aperture manager 112 may designate the system memory buffer as a non-coherent system memory buffer or a coherent system memory buffer. In at least one embodiment, the aperture manager 112 may designate buffers containing data that are primarily intended to be accessed and used by the PPU 120 as non-coherent system memory aperture buffers. For example, the aperture manager 112 may designate buffers containing texture data, vertex data, shader programs, compressible surfaces, framebuffer data, gaming buffers, GPU buffers, and the like as non-coherent system memory apertures buffers. In at least one embodiment, the aperture manager 112 can designate buffers (e.g., vertex buffers) containing data that are intended to be closely shared between the PPU 120 and the CPU 104 as coherent system memory aperture buffers. For example, if the system memory buffer is regularly used to communicate between the CPU and the PPU, the aperture manager 112 may designate the buffer as a coherent system memory aperture buffer.

When the PPU 120 writes data to the cache 122, the cache 122 can be updated based on apertures associated with the data, as designated by the aperture manager 112. In an illustrative example, the cache 122 can include multiple cache lines 208A through 208F (referred to generally as "cache lines 208" herein) where each cache line 208 includes at least an aperture field 202 and a data field 206. The aperture field 202 may include one or more bits indicating an aperture associated with the data 206. For example, '01' may indicate that the cached data is associated with a non-coherent system memory aperture buffer, '10' may indicate that the cached data is associated with a coherent system memory aperture buffer, and '11' may indicate that the cached data is associated with a video memory aperture buffer. As such, data stored at cache line 208A, cache line 208C, and cache line 208D may be associated with a non-coherent system memory aperture buffer; data stored at cache line 208B may be associated with a coherent system memory aperture buffer; and data stored at cache line 208F may be associated with a video memory aperture buffer.

The aperture manager 121 may issue aperture-specific cache line invalidate operations to the cache 122 after PPU 120 has finished working on the allocated buffer. For example, the aperture manager 121 can issue a cache operation to invalidate cache lines in the cache 122 associated with a non-coherent system memory aperture. Responsive to reception of a cache operation to invalidate non-coherent system memory aperture cache lines, a cache controller (not illustrated) of the cache 122 can sequentially access each cache line 208 to determine identifiers stored at respective aperture fields 202 of the cache lines 208. The cache controller can further cause cache lines storing data associated with a non-coherent system memory aperture to be flushed and invalidated. For example, responsive to receiving a cache operation to invalidate cache lines associated with a non-coherent memory aperture, cache lines 208A, 208C, and 208D can be flushed and invalidated.

To flush cache lines associated with a non-coherent memory aperture, the data may be written back to system memory 102 and/or one or more caches associated with the CPU 104, such as cache 122. In at least one embodiment, the cache 122 is a write-back cache such that write back of modified data to system memory 102 occurs when the cache line is flushed and invalidated as a result of a cache operation to invalidate non-coherent system memory cache lines. In at least one embodiment, to invalidate non-coherent system memory aperture cache lines, a state of the cache lines can be updated to reflect invalid status. In at least one embodiment, the cache 122 may operate according to a Modified, Exclusive, Shared, Invalid (MESI) coherency protocol such that one or bits of the non-coherent memory aperture cache lines are updated to reflect an invalid state. For example, a valid bit associated with the cache lines 208A, 208C, and 208D can be updated to reflect an invalid state.

In at least one embodiment, the PPU 120 can ensure that coherent system memory caches lines remain in the cache 122 and are not invalidated by operations to invalidate non-coherent system memory aperture cache lines. For example, in response to aperture manager 121 issuing a cache operation to invalidate non-coherent system memory cache lines, a cache controller of the cache 122 can ensure that cache line 208B remains in the cache 122 and is not invalidated. By using software-managed non-coherent system memory aperture cache line invalidates, coherent system memory aperture cache lines can be managed using hardware coherency protocols without destructive interference between coherent and non-coherent system memory cache lines in the cache 122.

In at least one embodiment, cache lines 208 can include one or more fields not illustrated with respect to FIG. 2. For example, cache lines 208 can each include a tag, an index, an offset, a block offset, etc. In at least one embodiment, cache lines 208 can include one or more additional fields to enable software-managed coherency at varying levels of abstraction. For example, cache lines 208 can include an additional field indicating a process associated with the data. The CPU 104 can be a multicore system with multiple processes that operate independently. A first process executing on the CPU 104 may allocate a first non-coherent buffer of data to be processed by the PPU 120. A second process executing on the CPU 104 may allocate a second non-coherent buffer of data to be processed by the PPU 120. The Cache 122 can write a portion of the first non-coherent buffer of data to cache line 208A and update a field of the cache line 208A with an identifier of the first process. The cache 122 may write a portion of the second non-coherent buffer of data to cache lines 208C and 208D and update respective fields with an identifier of the second process. When the CPU 104 is prepared to resume control of the first non-coherent buffer, the aperture manager 112 may initiate a cache operation to invalidate all non-coherent cache lines associated with the first process. Resultantly, cache line 208A may be flushed and invalidated while cache lines 208C and 208D remain valid and in the cache 122.

In at least one embodiment, the aperture manager 121 may issue non-coherent aperture cache line invalidates upon completion of associated tasks accelerated by the PPU 120. For example, an application processing on the CPU 104 may request (e.g., using aperture manager, an API, etc.) a non-coherent system memory 102 buffer for GPU. An operating system (OS) running on the CPU 104 may allocate the non-coherent system memory buffer and notify the PPU 120.

For example, a device driver associated with the PPU 120 may interface between the OS and PPU 120 hardware such that the device driver is notified when the OS allocates memory PPU 120 usage. Once the non-coherent system memory buffer is allocated and transferred to the PPU 120, the PPU 120 can launch kernels or tasks to perform computations on the PPU 120 using its parallel processing capabilities. After executing the assigned kernels/tasks, the PPU 120 may notify (e.g., using interrupts, events, inter-process communication, and/or the like) the CPU 104 that the assigned tasks have been completed. Upon receiving an indication that the PPU 120 has completed the assigned tasks, the PPU 120 may issue a cache line operation to invalidate non-coherent system memory aperture cache lines.

FIG. 3 illustrates a flowchart of a method 300 for aperture-specific cache operations, in accordance with at least one embodiment of the present disclosure. Although method 300 is described in the context of a processing unit, the method 300 may also be performed by a program, custom circuitry, or by a combination of custom circuitry and a program. For example, the method 300 may be executed by a GPU (graphics processing unit), CPU (central processing unit), or any processor capable of issuing or receiving aperture-specific cache operations. Furthermore, persons of ordinary skill in the art will understand that any system that performs method 300 is within the scope and spirit of embodiments of the present invention.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Although shown in a particular sequence or order, unless otherwise specified, the order of the operations can be modified. Thus, the illustrated embodiments should be understood only as examples, and the illustrated operations can be performed in a different order, and some operations can be performed in parallel. Additionally, one or more operations can be omitted in various embodiments. Thus, not all operations are required in every embodiment.

At operation 302 of method 300, processing circuitry may receive, at a parallel processing unit (PPU) including a first cache, a cache operation to modify cache lines of the first cache associated with a first aperture of a system memory of a processing device. In at least one embodiment, the processing device can be CPU 104 of FIG. 1, the first cache can be cache 122 of FIG. 1, and the PPU can be PPU 120 of FIG. 1. In at least one embodiment, the PPU and the processing device are interconnected via an interface using a common hardware interface (CHI) protocol.

At operation 304 of method 300, the processing circuitry may identify a first subset of cache lines of the first cache, where the first subset of cache lines is associated with the first aperture of the system memory. In an illustrative example, the first subset of cache lines may include cache lines 208A, 208C, and 208D of FIG. 2. In at least one embodiment, the first aperture is a non-coherent aperture of the system memory.

At operation 306 of method 300, the processing circuitry may identify a second subset of cache lines of the first cache, where the second subset of cache lines is associated with a second aperture of the system memory. In an illustrative example, the second subset of cache lines may include cache line 208B of FIG. 2. In at least one embodiment, the second aperture is a coherent aperture of the system memory. In at least one embodiment, the first subset of cache lines and the second subset of cache lines are identified based on identifiers associated with the non-coherent aperture and the coherent aperture, respectively.

At operation 308 of method 300, the processing circuitry may modify the first subset of cache lines as specified by the cache operation. For example, the processing circuitry may modify cache lines 208A, 208C, and 208D of FIG. 2. In at least one embodiment, the cache operation is an invalidate operation, and to modify the first subset of cache lines the processing circuitry is to write data stored at the first subset of cache lines back to a second cache of the processing device, and invalidate the first subset of cache lines. In at least one embodiment, the second cache may be cache 110 of FIG. 1. In at least one embodiment, the cache operation is a flush operation, and to modify the first subset of cache lines, the processing circuitry is to write data stored at the first subset of cache lines back to the second cache of the processing device, and maintain a clean state of the first subset of cache lines.

In at least one embodiment, the processing circuitry may further cause the second subset of cache lines to be maintained within the second cache. In at least one embodiment, coherency of the second subset of cache lines is managed by hardware associated with the processing device. For example, coherency cache line associated with a coherent system memory aperture may be managed based on a hardware interface using a directory-based approach.

In at least one embodiment, the first subset of cache lines can further be differentiated and invalidated based on a process identifier that indicates one of a plurality of processes associated with the processing device. For example, the processing circuitry may receive an operation to invalidate non-coherent aperture cache lines of the second cache associated with a first process. The process logic may further invalidate one or more cache lines of the first subset of cache lines associated with the first process.

Parallel Processing Architecture

Figure 4:
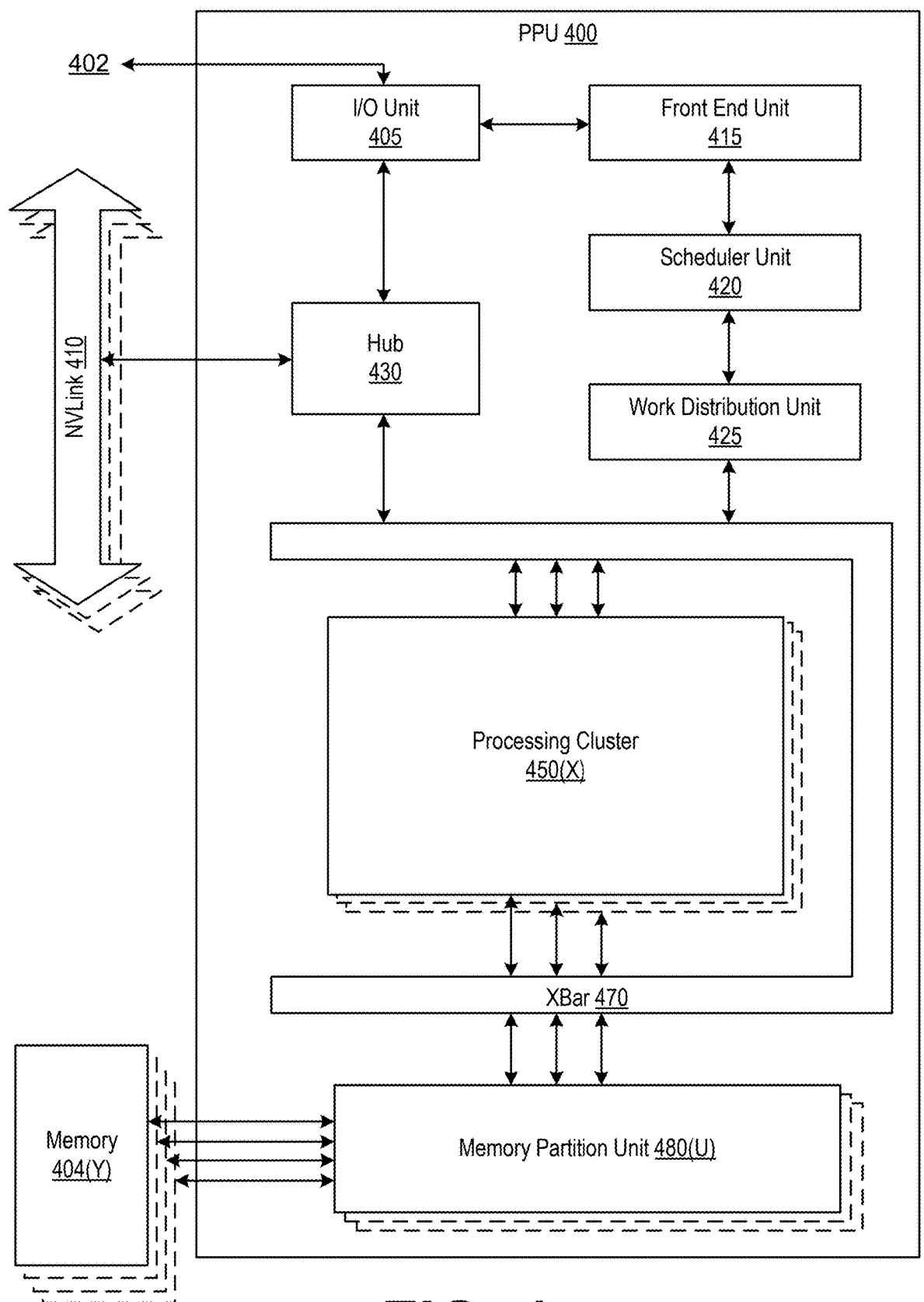
FIG. 4 illustrates a parallel processing unit, in accordance with at least one embodiment of the present disclosure.

FIG. 4 illustrates a parallel processing unit (PPU) 400, in accordance with an embodiment. In an embodiment, the PPU 400 is a multi-threaded processor that is implemented on one or more integrated circuit devices. The PPU 400 is a latency hiding architecture designed to process many threads in parallel. A thread (e.g., a thread of execution) is an instantiation of a set of instructions configured to be executed by the PPU 400. In an embodiment, the PPU 400 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 400 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 400 may be configured to accelerate thousands of High Performance Computing (HPC), data center, and machine learning applications. The PPU 400 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 4, the PPU 400 includes an Input/Output (I/O) unit 405, a front-end unit 415, a scheduler unit 420, a work distribution unit 425, a hub 430, a crossbar (Xbar) 470, one or more processing clusters 450 (e.g., general processing clusters (GPCs), and one or more partition units 480. The PPU 400 may be connected to a host processor or other PPUs 400 via one or more high-speed NVLink 410 interconnect. The PPU 400 may be connected to a host processor or other peripheral devices via an interconnect 402. The PPU 400 may also be connected to a local memory comprising a number of memory devices 404. In an embodiment, the local memory may comprise a number of dynamic random-access memory (DRAM) devices. The DRAM devices may be configured as a high-bandwidth memory (HBM) subsystem, with multiple DRAM dies stacked within each device.

The NVLink 410 interconnect enables systems to scale and include one or more PPUs 400 combined with one or more CPUs, supports cache coherence between the PPUs 400 and CPUs, and CPU mastering. Data and/or commands may be transmitted by the NVLink 410 through the hub 430 to/from other units of the PPU 400 such as one or more copy engines, a video encoder, a video decoder, a power management unit, etc. (not explicitly shown). The NVLink 410 is described in more detail in conjunction with FIG. 4B.

The I/O unit 405 is configured to transmit and receive communications (e.g., commands, data, etc.) from a host processor (not shown) over the interconnect 402. The I/O unit 405 may communicate with the host processor directly via the interconnect 402 or through one or more intermediate devices such as a memory bridge. In an embodiment, the I/O unit 405 may communicate with one or more other processors, such as one or more the PPUs 400 via the interconnect 402. In an embodiment, the I/O unit 405 implements a Peripheral Component Interconnect Express (PCIe) interface for communications over a PCIe bus and the interconnect 402 is a PCIe bus. In alternative embodiments, the I/O unit 405 may implement other types of well-known interfaces for communicating with external devices.

The I/O unit 405 decodes packets received via the interconnect 402. In an embodiment, the packets represent commands configured to cause the PPU 400 to perform various operations. The I/O unit 405 transmits the decoded commands to various other units of the PPU 400 as the commands may specify. For example, some commands may be transmitted to the front-end unit 415. Other commands may be transmitted to the hub 430 or other units of the PPU 400 such as one or more copy engines, a video encoder, a video decoder, a power management unit, etc. (not explicitly shown). In other words, the I/O unit 405 is configured to route communications between and among the various logical units of the PPU 400.

In an embodiment, a program executed by the host processor encodes a command stream in a buffer that provides workloads to the PPU 400 for processing. A workload may comprise several instructions and data to be processed by those instructions. The buffer is a region in a memory that is accessible (e.g., read/write) by both the host processor and the PPU 400. For example, the I/O unit 405 may be configured to access the buffer in a system memory connected to the interconnect 402 via memory requests transmitted over the interconnect 402. In an embodiment, the host processor writes the command stream to the buffer and then transmits a pointer to the start of the command stream to the PPU 400. The front-end unit 415 receives pointers to one or more command streams. The front-end unit 415 manages the one or more streams, reading commands from the streams and forwarding commands to the various units of the PPU 400.

The front-end unit 415 is coupled to a scheduler unit 420 that configures the various processing clusters 450 to process tasks defined by the one or more streams. The scheduler unit 420 is configured to track state information related to the various tasks managed by the scheduler unit 420. The state may indicate which processing cluster 450 a task is assigned to, whether the task is active or inactive, a priority level associated with the task, and so forth. The scheduler unit 420 manages the execution of a plurality of tasks on the one or more processing clusters 450.

The scheduler unit 420 is coupled to a work distribution unit 425 that is configured to dispatch tasks for execution on the processing clusters 450. The work distribution unit 425 may track a number of scheduled tasks received from the scheduler unit 420. In an embodiment, the work distribution unit 425 manages a pending task pool and an active task pool for each of the processing clusters 450. The pending task pool may comprise a number of slots (e.g., 32 slots) that contain tasks assigned to be processed by a particular processing cluster 450. The active task pool may comprise a number of slots (e.g., 4 slots) for tasks that are actively being processed by the processing clusters 450. As a processing cluster 450 finishes the execution of a task, that task is evicted from the active task pool for the processing cluster 450 and one of the other tasks from the pending task pool is selected and scheduled for execution on the processing cluster 450. If an active task has been idle on the processing cluster 450, such as while waiting for a data dependency to be resolved, then the active task may be evicted from the processing cluster 450 and returned to the pending task pool while another task in the pending task pool is selected and scheduled for execution on the processing cluster 450.

The work distribution unit 425 communicates with the one or more processing clusters 450 via XBar 470. The XBar 470 is an interconnect network that couples many of the units of the PPU 400 to other units of the PPU 400. For example, the XBar 470 may be configured to couple the work distribution unit 425 to a particular processing cluster 450. Although not shown explicitly, one or more other units of the PPU 400 may also be connected to the XBar 470 via the hub 430.

The tasks are managed by the scheduler unit 420 and dispatched to a processing cluster 450 by the work distribution unit 425. The processing cluster 450 is configured to process the task and generate results. The results may be consumed by other tasks within the processing cluster 450, routed to a different processing cluster 450 via the XBar 470, or stored in the memory 404. The results can be written to the memory 404 via the partition units 480, which implement a memory interface for reading and writing data to/from the memory 404. The results can be transmitted to another PPU 400 or CPU via the NVLink 410. In an embodiment, the PPU 400 includes a number U of partition units 480 that is equal to the number of separate and distinct memory devices 404 coupled to the PPU 400. A partition unit 480 will be described in more detail below in conjunction with FIG. 5B.

In an embodiment, a host processor executes a driver kernel that implements an application programming interface (API) that enables one or more applications executing on the host processor to schedule operations for execution on the PPU 400. In an embodiment, multiple compute applications are simultaneously executed by the PPU 400 and the PPU 400 provides isolation, quality of service (QoS), and independent address spaces for the multiple compute applications. An application may generate instructions (e.g., API calls) that cause the driver kernel to generate one or more tasks for execution by the PPU 400. The driver kernel outputs tasks to one or more streams being processed by the PPU 400. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 6A.

Figure 5A:
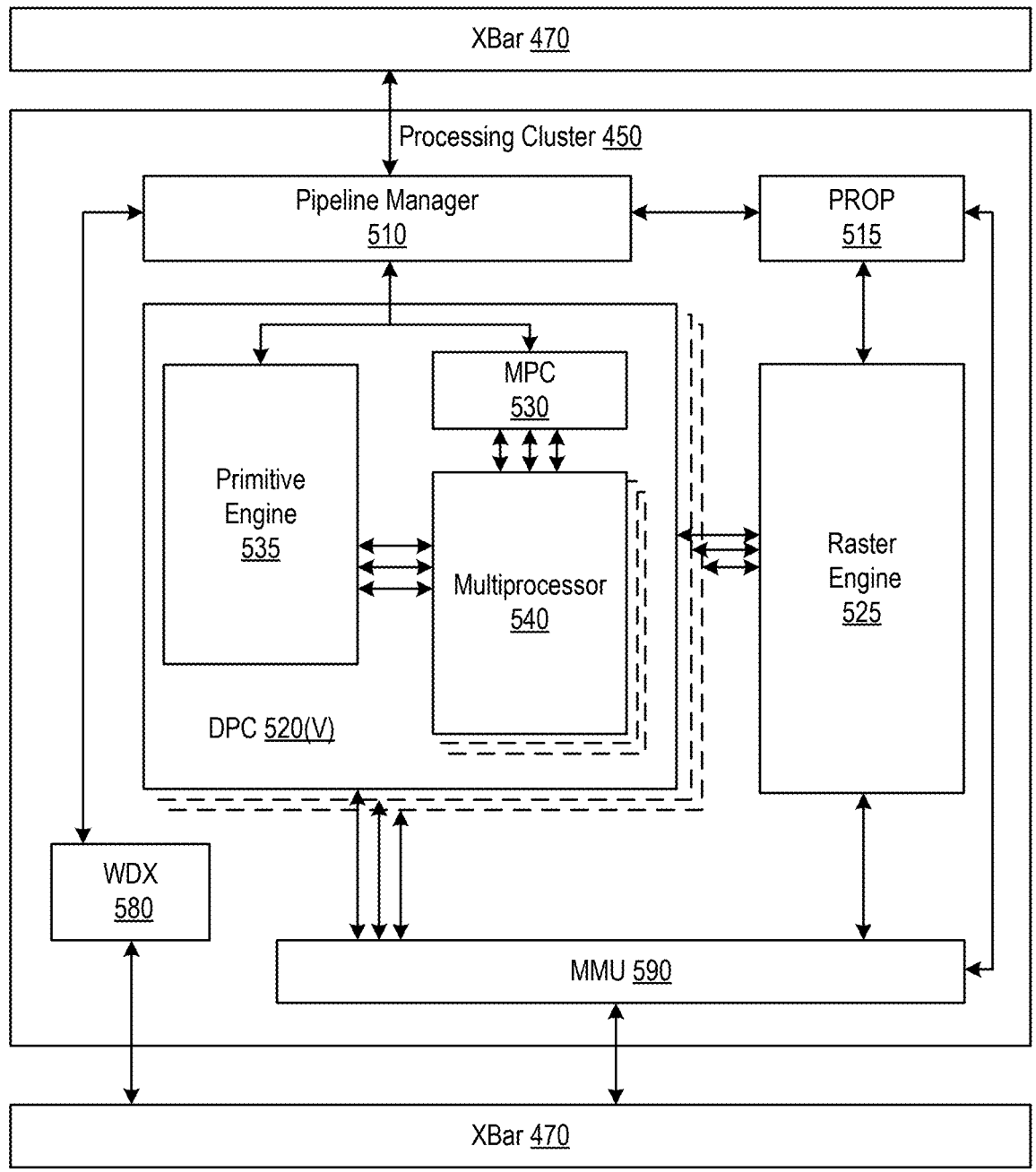
FIG. 5A illustrates a general processing cluster within the parallel processing unit of FIG. 4, in accordance with at least one embodiment of the present disclosure.

FIG. 5A illustrates a processing cluster 450 of the PPU 400 of FIG. 4, in accordance with an embodiment. As shown in FIG. 5A, each processing cluster 450 includes a number of hardware units for processing tasks. In an embodiment, each processing cluster 450 includes a pipeline manager 510, a pre-raster operations unit (PROP) 515, a raster engine 525, a work distribution crossbar (WDX) 580, a memory management unit (MMU) 590, and one or more Data Processing Clusters (DPCs) 520. It will be appreciated that the processing cluster 450 of FIG. 5A may include other hardware units in lieu of or in addition to the units shown in FIG. 5A.

In an embodiment, the operation of the processing cluster 450 is controlled by the pipeline manager 510. The pipeline manager 510 manages the configuration of the one or more DPCs 520 for processing tasks allocated to the processing cluster 450. In an embodiment, the pipeline manager 510 may configure at least one of the one or more DPCs 520 to implement at least a portion of a graphics rendering pipeline. For example, a DPC 520 may be configured to execute a vertex shader program on the programmable multiprocessor 540. Multiprocessors 540 may generally include streaming multiprocessors, compute units, many integrated cores, and the like. The pipeline manager 510 may also be configured to route packets received from the work distribution unit 425 to the appropriate logical units within the processing cluster 450. For example, some packets may be routed to fixed function hardware units in the PROP 515 and/or raster engine 525 while other packets may be routed to the DPCs 520 for processing by the primitive engine 535 or the multiprocessor 540. In an embodiment, the pipeline manager 510 may configure at least one of the one or more DPCs 520 to implement a neural network model and/or a computing pipeline.

Figure 5B:
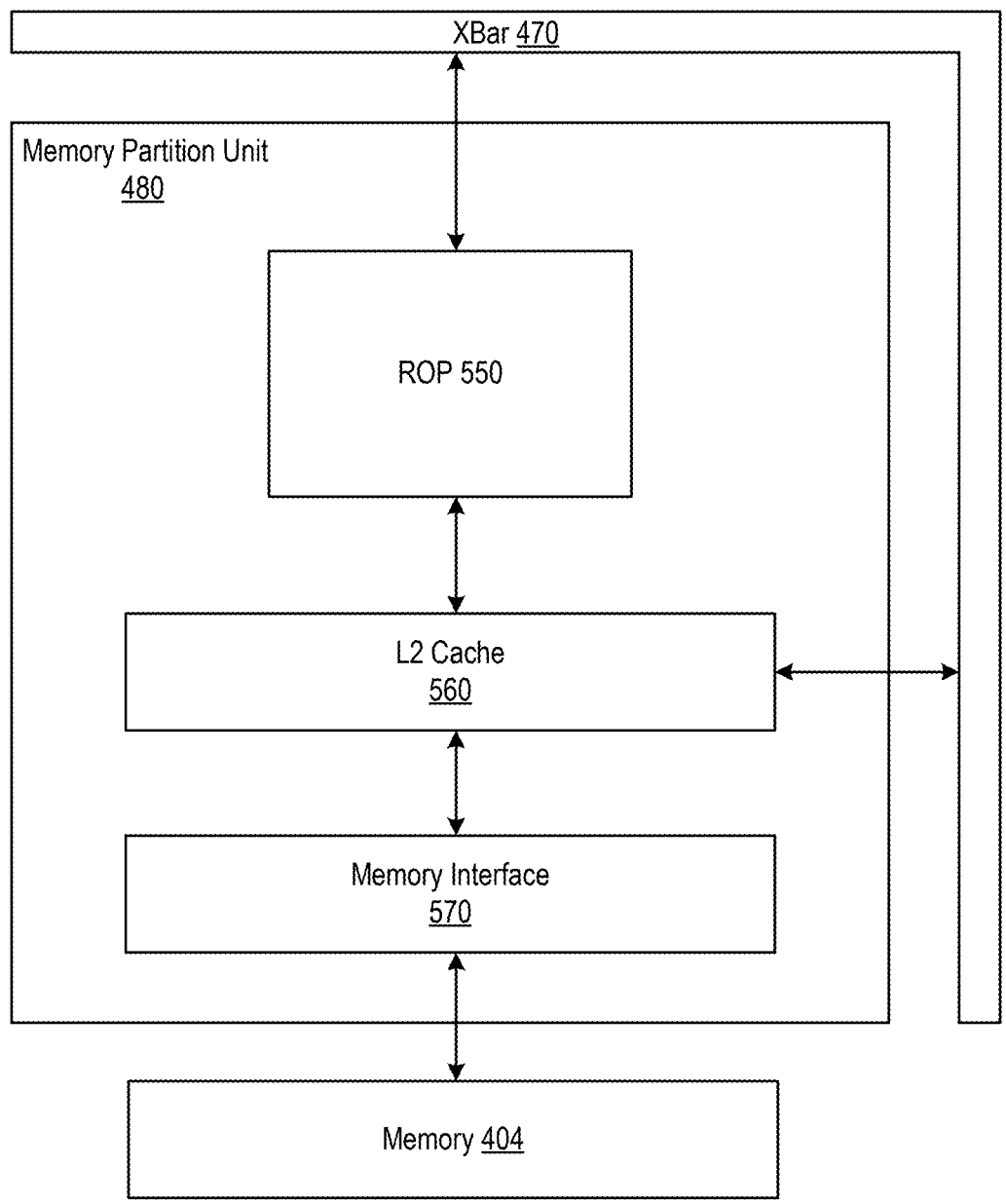
FIG. 5B illustrates a memory partition unit of the parallel processing unit of FIG. 4, in accordance with at least one embodiment of the present disclosure.

The PROP unit 515 is configured to route data generated by the raster engine 525 and the DPCs 520 to a Raster Operations (ROP) unit, described in more detail in conjunction with FIG. 5B. The PROP unit 515 may also be configured to perform optimizations for color blending, organize pixel data, perform address translations, and the like.

The raster engine 525 includes a number of fixed function hardware units configured to perform various raster operations. In an embodiment, the raster engine 525 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 525 comprises fragments to be processed, for example, by a fragment shader implemented within a DPC 520.

Each DPC 520 included in the processing cluster 450 includes an M-Pipe Controller (MPC) 530, a primitive engine 535, and one or more Multiprocessors 540. The MPC 530 controls the operation of the DPC 520, routing packets received from the pipeline manager 510 to the appropriate units in the DPC 520. For example, packets associated with a vertex may be routed to the primitive engine 535, which is configured to fetch vertex attributes associated with the vertex from the memory 404. In contrast, packets associated with a shader program may be transmitted to the multiprocessor 540.

In some embodiments, the multiprocessor 540 comprises a programmable multiprocessor, such as a programmable streaming multiprocessor, that is configured to process tasks represented by a number of threads. Each multiprocessor 540 is multi-threaded and configured to execute a plurality of threads (e.g., 32 threads) from a particular group of threads concurrently. In an embodiment, the multiprocessor 540 implements a SIMD (Single-Instruction, Multiple-Data) architecture where each thread in a group of threads (e.g., a warp) is configured to process a different set of data based on the same set of instructions. All threads in the group of threads execute the same instructions. In another embodiment, the multiprocessor 540 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state are maintained for each warp, enabling concurrency between warps and serial execution within warps when threads within the warp diverge. In another embodiment, a program counter, call stack, and execution state are maintained for each individual thread, enabling equal concurrency between all threads, within and between warps. When execution state is maintained for each individual thread, threads executing the same instructions may be converged and executed in parallel for maximum efficiency. The multiprocessor 540 will be described in more detail below in conjunction with FIG. 6A.

The MMU 590 provides an interface between the processing cluster 450 and the partition unit 480. The MMU 590 may provide translation of virtual addresses into physical addresses, memory protection, and arbitration of memory requests. In an embodiment, the MMU 590 provides one or more translation lookaside buffers (TLBs) for performing translation of virtual addresses into physical addresses in the memory 404.

FIG. 5B illustrates a memory partition unit 480 of the PPU 400 of FIG. 4, in accordance with an embodiment. As shown in FIG. 5B, the memory partition unit 480 includes a Raster Operations (ROP) unit 550, a level two (L2) cache 560, and a memory interface 570. The memory interface 570 is coupled to the memory 404. Memory interface 570 may implement 32, 64, 128, 1024-bit data buses, or the like, for high-speed data transfer. In an embodiment, the PPU 400 incorporates U memory interfaces 570, one memory interface 570 per pair of partition units 480, where each pair of partition units 480 is connected to a corresponding memory device 404. For example, PPU 400 may be connected to up to Y memory devices 404, such as high bandwidth memory stacks or graphics double-data-rate, version 5, synchronous dynamic random-access memory, or other types of persistent storage.

In an embodiment, the memory interface 570 implements an HBM2 memory interface and Y equals half U. In an embodiment, the HBM2 memory stacks are located on the same physical package as the PPU 400, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 404 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 400 process very large datasets and/or run applications for extended periods.

In an embodiment, the PPU 400 implements a multi-level memory hierarchy. In an embodiment, the memory partition unit 480 supports a unified memory to provide a single unified virtual address space for CPU and PPU 400 memory, enabling data sharing between virtual memory systems. In an embodiment the frequency of accesses by a PPU 400 to memory located on other processors is traced to ensure that memory pages are moved to the physical memory of the PPU 400 that is accessing the pages more frequently. In an embodiment, the NVLink 410 supports address translation services allowing the PPU 400 to directly access a CPU's page tables and providing full access to CPU memory by the PPU 400.

In an embodiment, copy engines transfer data between multiple PPUs 400 or between PPUs 400 and CPUs. The copy engines can generate page faults for addresses that are not mapped into the page tables. The memory partition unit 480 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 404 or other system memory may be fetched by the memory partition unit 480 and stored in the L2 cache 560, which is located on-chip and is shared between the various processing clusters 450. As shown, each memory partition unit 480 includes a portion of the L2 cache 560 associated with a corresponding memory device 404. Lower-level caches may then be implemented in various units within the processing clusters 450. For example, each of the multiprocessors 540 may implement a level one (L1) cache. The L1 cache is private memory that is dedicated to a particular multiprocessor 540. Data from the L2 cache 560 may be fetched and stored in each of the L1 caches for processing in the functional units of the Multiprocessors 540. The L2 cache 560 is coupled to the memory interface 570 and the XBar 470.

The ROP unit 550 performs graphics raster operations related to pixel color, such as color compression, pixel blending, and the like. The ROP unit 550 also implements depth testing in conjunction with the raster engine 525, receiving a depth for a sample location associated with a pixel fragment from the culling engine of the raster engine 525. The depth is tested against a corresponding depth in a depth buffer for a sample location associated with the fragment. If the fragment passes the depth test for the sample location, then the ROP unit 550 updates the depth buffer and transmits a result of the depth test to the raster engine 525. It will be appreciated that the number of partition units 480 may be different than the number of processing clusters 450 and, therefore, each ROP unit 550 may be coupled to each of the processing clusters 450. The ROP unit 550 tracks packets received from the different processing clusters 450 and determines which processing cluster 450 that a result generated by the ROP unit 550 is routed to through the Xbar 470. Although the ROP unit 550 is included within the memory partition unit 480 in FIG. 5B, in other embodiment, the ROP unit 550 may be outside of the memory partition unit 480. For example, the ROP unit 550 may reside in the processing cluster 450 or another unit.

Figure 6A:
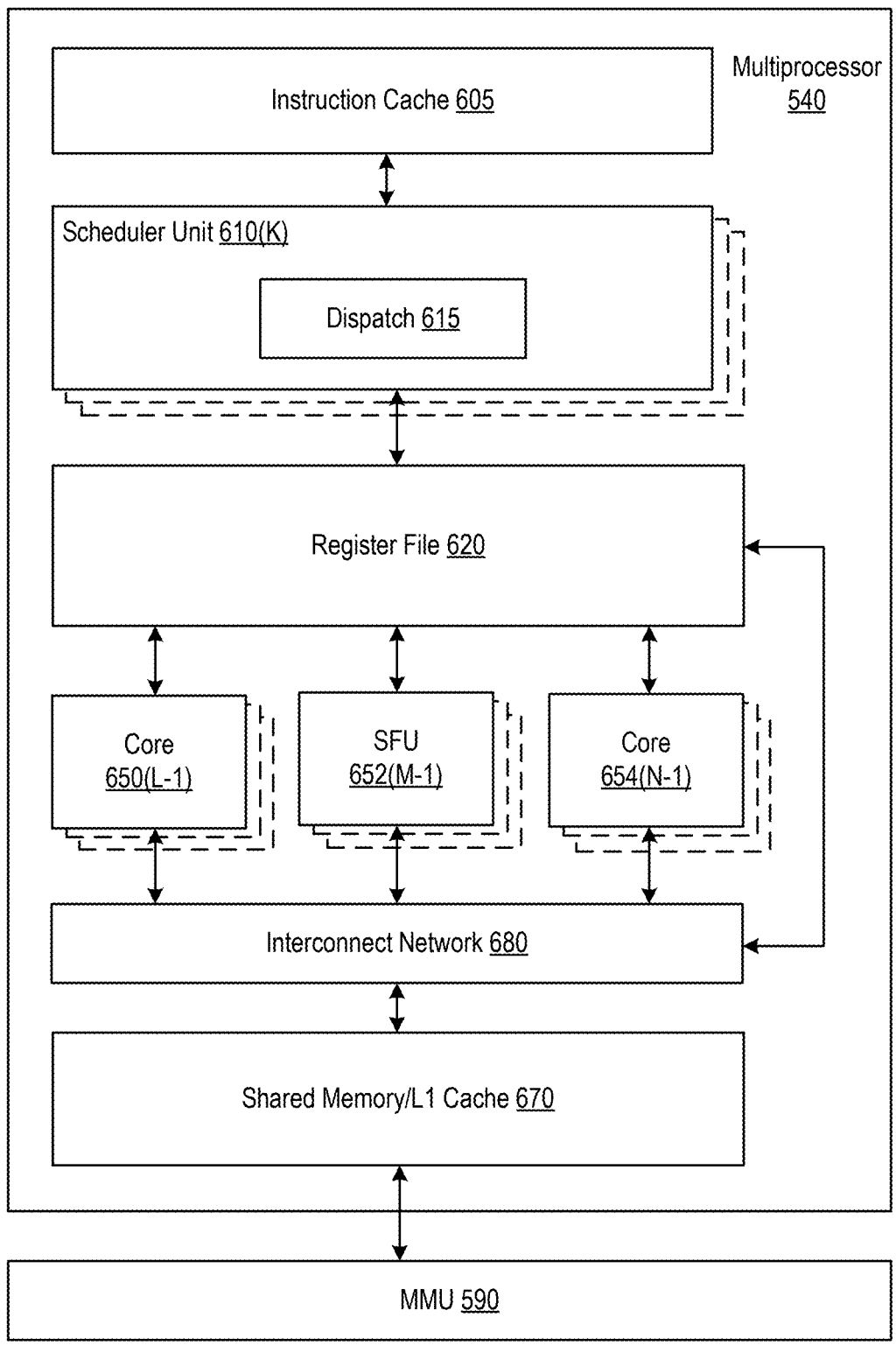
FIG. 6A illustrates the streaming multi-processor of FIG. 5A, in accordance with at least one embodiment of the present disclosure.

FIG. 6A illustrates the multiprocessor 540 of FIG. 5A, in accordance with an embodiment. As shown in FIG. 6A, the multiprocessor 540 includes an instruction cache 605, one or more scheduler units 610, a register file 620, one or more processing cores 650, one or more special function units (SFUs) 652, one or more load/store units (LSUs) 654, an interconnect network 680, a shared memory/L1 cache 670.

As described above, the work distribution unit 425 dispatches tasks for execution on the processing clusters 450 of the PPU 400. The tasks are allocated to a particular DPC 520 within a processing cluster 450 and, if the task is associated with a shader program, the task may be allocated to a multiprocessor 540. The scheduler unit 610 receives the tasks from the work distribution unit 425 and manages instruction scheduling for one or more thread blocks assigned to the multiprocessor 540. The scheduler unit 610 schedules thread blocks for execution as warps of parallel threads, where each thread block is allocated at least one warp. In an embodiment, each warp executes 32 threads. The scheduler unit 610 may manage a plurality of different thread blocks, allocating the warps to the different thread blocks and then dispatching instructions from the plurality of different cooperative groups to the various functional units (e.g., cores 650, SFUs 652, and LSUs 654) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 615 is configured to transmit instructions to one or more of the functional units. In the embodiment, the scheduler unit 610 includes two dispatch units 615 that enable two different instructions from the same warp to be dispatched during each clock cycle. In alternative embodiments, each scheduler unit 610 may include a single dispatch unit 615 or additional dispatch units 615.

Each multiprocessor 540 includes a register file 620 that provides a set of registers for the functional units of the multiprocessor 540. In an embodiment, the register file 620 is divided between each of the functional units such that each functional unit is allocated a dedicated portion of the register file 620. In another embodiment, the register file 620 is divided between the different warps being executed by the multiprocessor 540. The register file 620 provides temporary storage for operands connected to the data paths of the functional units.

Each multiprocessor 540 comprises L processing cores 650. In an embodiment, the multiprocessor 540 includes a large number (e.g., 128, etc.) of distinct processing cores 650. Each core 650 may include a fully-pipelined, single-precision, double-precision, and/or mixed precision processing unit that includes a floating-point arithmetic logic unit and an integer arithmetic logic unit. In an embodiment, the floating-point arithmetic logic units implement the IEEE 754-2008 standard for floating point arithmetic. In an embodiment, the cores 650 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 650. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each multiprocessor 540 also comprises M SFUs 652 that perform special functions (e.g., attribute evaluation, reciprocal square root, and the like). In an embodiment, the SFUs 652 may include a tree traversal unit configured to traverse a hierarchical tree data structure. In an embodiment, the SFUs 652 may include texture unit configured to perform texture map filtering operations. In an embodiment, the texture units are configured to load texture maps (e.g., a 2D array of texels) from the memory 404 and sample the texture maps to produce sampled texture values for use in shader programs executed by the multiprocessor 540. In an embodiment, the texture maps are stored in the shared memory/L1 cache 570. The texture units implement texture operations such as filtering operations using mip-maps (e.g., texture maps of varying levels of detail). In an embodiment, each SM 440 includes two texture units.

Each multiprocessor 540 also comprises N LSUs 654 that implement load and store operations between the shared memory/L1 cache 670 and the register file 620. Each multiprocessor 540 includes an interconnect network 680 that connects each of the functional units to the register file 620 and the LSU 654 to the register file 620, shared memory/L1 cache 670. In an embodiment, the interconnect network 680 is a crossbar that can be configured to connect any of the functional units to any of the registers in the register file 620 and connect the LSUs 654 to the register file and memory locations in shared memory/L1 cache 670.

The shared memory/L1 cache 670 is an array of on-chip memory that allows for data storage and communication between the multiprocessor 540 and the primitive engine 535 and between threads in the multiprocessor 540. In an embodiment, the shared memory/L1 cache 670 comprises 128 KB of storage capacity and is in the path from the multiprocessor 540 to the partition unit 480. The shared memory/L1 cache 670 can be used to cache reads and writes. One or more of the shared memory/L1 cache 670, L2 cache 560, and memory 404 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 670 enables the shared memory/L1 cache 670 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 4, are bypassed, creating a much simpler programming model. In the general-purpose parallel computation configuration, the work distribution unit 425 assigns and distributes blocks of threads directly to the DPCs 520. The threads in a block execute the same program, using a unique thread ID in the calculation to ensure each thread generates unique results, using the multiprocessor 540 to execute the program and perform calculations, shared memory/L1 cache 670 to communicate between threads, and the LSU 654 to read and write global memory through the shared memory/L1 cache 670 and the memory partition unit 480. When configured for general purpose parallel computation, the multiprocessor 540 can also write commands that the scheduler unit 420 can use to launch new work on the DPCs 520.

The PPU 400 may be included in a desktop computer, a laptop computer, a tablet computer, servers, supercomputers, a smart phone (e.g., a wireless, hand-held device), personal digital assistant (PDA), a digital camera, a vehicle, a head mounted display, a hand-held electronic device, and the like. In an embodiment, the PPU 400 is embodied on a single semiconductor substrate. In another embodiment, the PPU 400 is included in a system-on-a-chip (SoC) along with one or more other devices such as additional PPUs 400, the memory 404, a reduced instruction set computer (RISC) CPU, a memory management unit (MMU), a digital-to-analog converter (DAC), and the like.

In an embodiment, the PPU 400 may be included on a graphics card that includes one or more memory devices 404. The graphics card may be configured to interface with a PCIe slot on a motherboard of a desktop computer. In yet another embodiment, the PPU 400 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 6B:
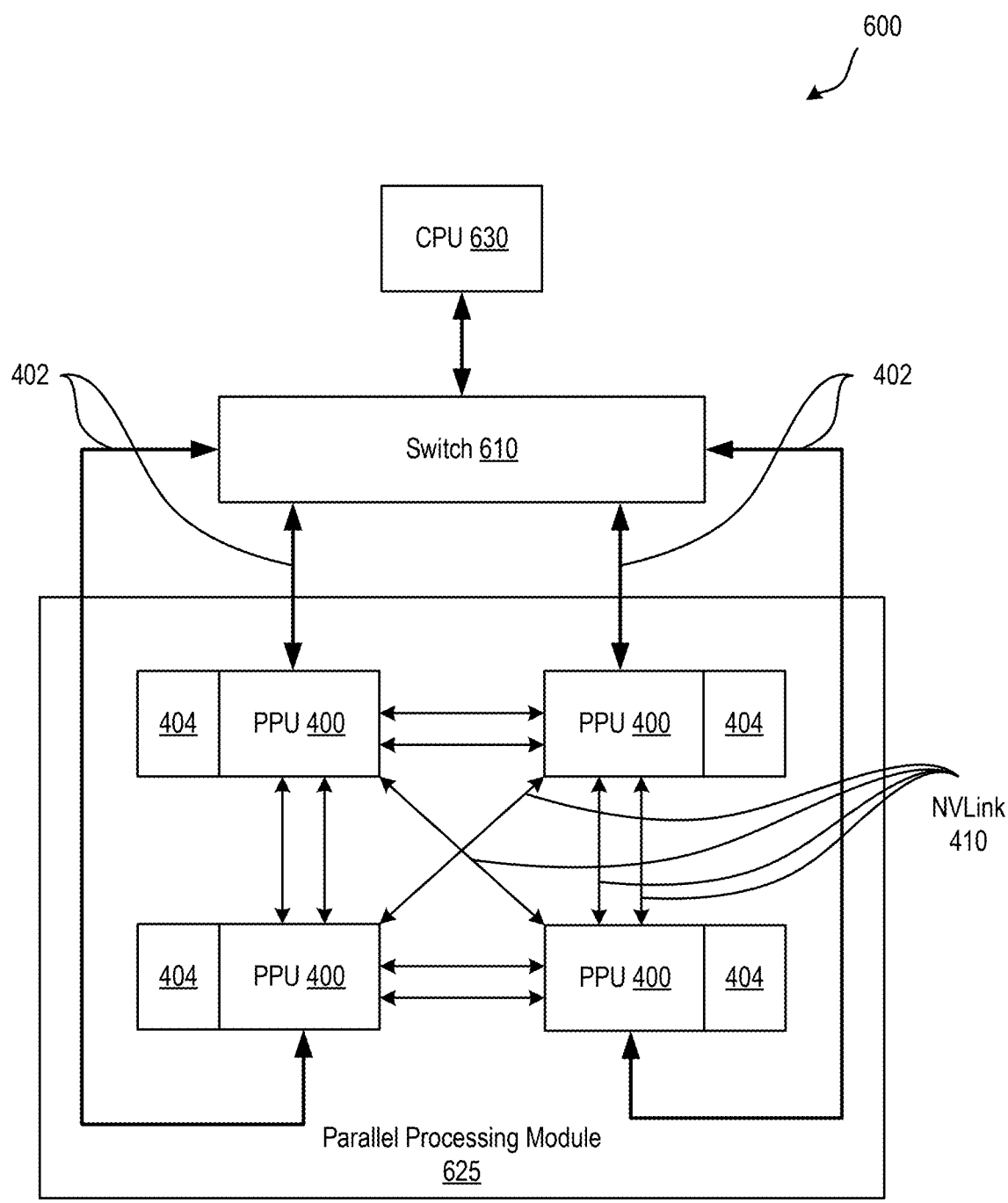
FIG. 6B is a conceptual diagram of a processing system implemented using the PPU of FIG. 4, with at least one embodiment of the present disclosure.

FIG. 6B is a conceptual diagram of a processing system 600 implemented using the PPU 400 of FIG. 4, in accordance with an embodiment. The exemplary system 665 may be configured to implement the method 300 shown in FIG. 4. The processing system 600 includes a CPU 630, switch 612, and multiple PPUs 400 each and respective memories 404. The NVLink 410 provides high-speed communication links between each of the PPUs 400. Although a particular number of NVLink 410 and interconnect 402 connections are illustrated in FIG. 6B, the number of connections to each PPU 400 and the CPU 630 may vary. The switch 612 interfaces between the interconnect 402 and the CPU 630. The PPUs 400, memories 404, and NVLinks 410 may be situated on a single semiconductor platform to form a parallel processing module 625. In an embodiment, the switch 612 supports two or more protocols to interface between various different connections and/or links.

In another embodiment (not shown), the NVLink 410 provides one or more high-speed communication links between each of the PPUs 400 and the CPU 630 and the switch 612 interfaces between the interconnect 402 and each of the PPUs 400. The PPUs 400, memories 404, and interconnect 402 may be situated on a single semiconductor platform to form a parallel processing module 625. In yet another embodiment (not shown), the interconnect 402 provides one or more communication links between each of the PPUs 400 and the CPU 630 and the switch 612 interfaces between each of the PPUs 400 using the NVLink 410 to provide one or more high-speed communication links between the PPUs 400. In another embodiment (not shown), the NVLink 410 provides one or more high-speed communication links between the PPUs 400 and the CPU 630 through the switch 612. In yet another embodiment (not shown), the interconnect 402 provides one or more communication links between each of the PPUs 400 directly. One or more of the NVLink 410 high-speed communication links may be implemented as a physical NVLink interconnect or either an on-chip or on-die interconnect using the same protocol as the NVLink 410.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 625 may be implemented as a circuit board substrate and each of the PPUs 400 and/or memories 404 may be packaged devices. In an embodiment, the CPU 630, switch 612, and the parallel processing module 625 are situated on a single semiconductor platform.

In an embodiment, the signaling rate of each NVLink 410 is 20 to 25 Gigabits/second and each PPU 400 includes six NVLink 410 interfaces (as shown in FIG. 6B, five NVLink 410 interfaces are included for each PPU 400). Each NVLink 410 provides a data transfer rate of 25 Gigabytes/second in each direction, with six links providing 500 Gigabytes/second. The NVLinks 410 can be used exclusively for PPU-to-PPU communication as shown in FIG. 6B, or some combination of PPU-to-PPU and PPU-to-CPU, when the CPU 630 also includes one or more NVLink 410 interfaces.

In an embodiment, the NVLink 410 allows direct load/store/atomic access from the CPU 630 to each PPU's 400 memory 404. In an embodiment, the NVLink 410 supports coherency operations, allowing data read from the memories 404 to be stored in the cache hierarchy of the CPU 630, reducing cache access latency for the CPU 630. In an embodiment, the NVLink 410 includes support for Address Translation Services (ATS), allowing the PPU 400 to directly access page tables within the CPU 630. One or more of the NVLinks 410 may also be configured to operate in a low-power mode.

Figure 6C:
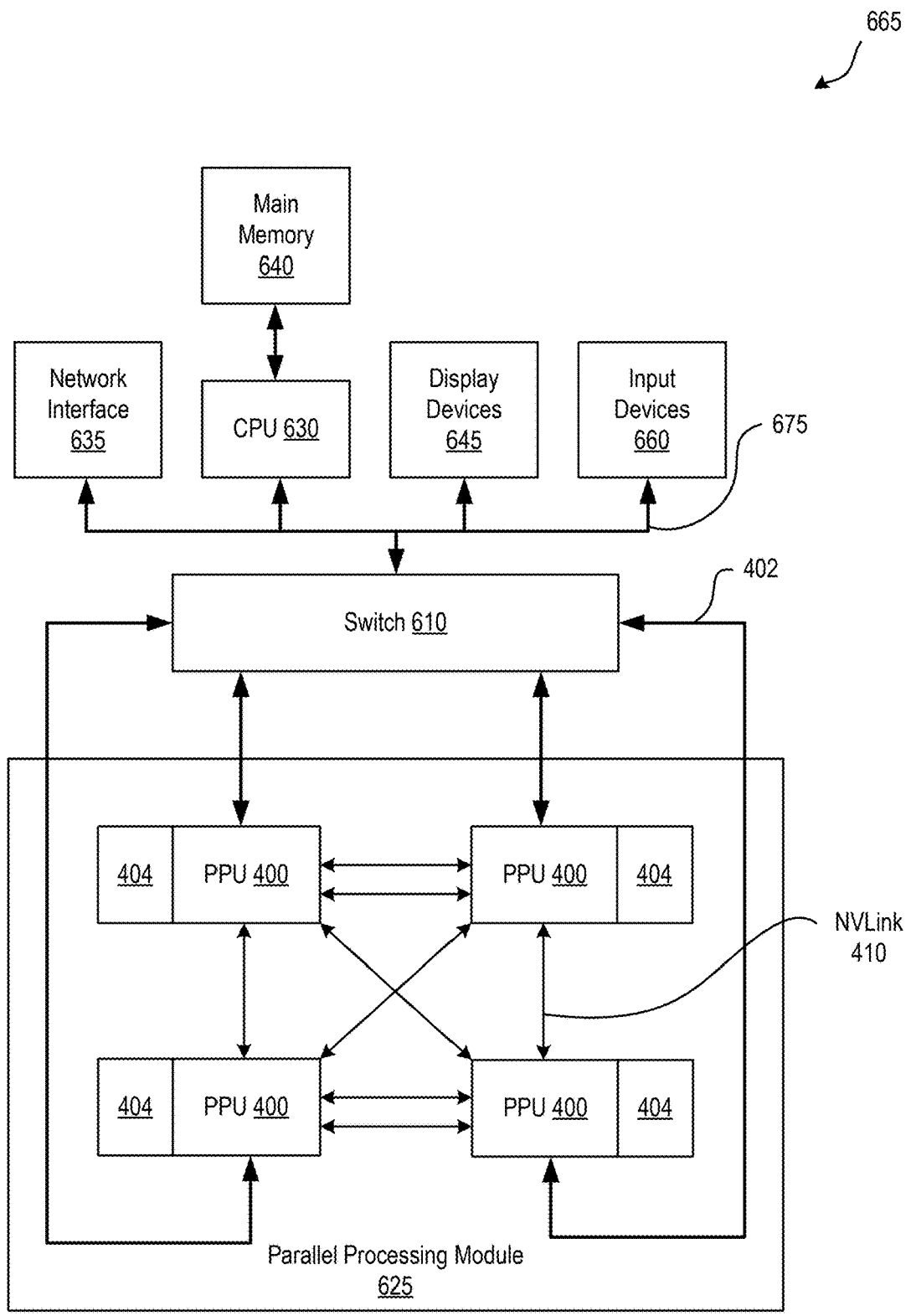
FIG. 6C illustrates an exemplary system in which the various architecture and/or functionality of the various previous embodiments may be implemented.

FIG. 6C illustrates an exemplary system 665 in which the various architecture and/or functionality of the various previous embodiments may be implemented. The exemplary system 665 may be configured to implement the method 300 shown in FIG. 4.

As shown, a system 665 is provided including at least one central processing unit 630 that is connected to a communication bus 675. The communication bus 675 may be implemented using any suitable protocol, such as PCI (Peripheral Component Interconnect), PCI-Express, AGP (Accelerated Graphics Port), HyperTransport, or any other bus or point-to-point communication protocol(s). The system 665 also includes a main memory 640. Control logic (software) and data are stored in the main memory 640 which may take the form of random-access memory (RAM).

The system 665 also includes input devices 660, the parallel processing system 625, and display devices 645, e.g., a conventional CRT (cathode ray tube), LCD (liquid crystal display), LED (light emitting diode), plasma display or the like. User input may be received from the input devices 660, e.g., keyboard, mouse, touchpad, microphone, and the like. Each of the foregoing modules and/or devices may even be situated on a single semiconductor platform to form the system 665. Alternately, the various modules may also be situated separately or in various combinations of semiconductor platforms per the desires of the user.

Further, the system 665 may be coupled to a network (e.g., a telecommunications network, local area network (LAN), wireless network, wide area network (WAN) such as the Internet, peer-to-peer network, cable network, or the like) through a network interface 635 for communication purposes.

The system 665 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 640 and/or the secondary storage. Such computer programs, when executed, enable the system 665 to perform various functions. The memory 640, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 665 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Graphics Processing Pipeline

In an embodiment, the PPU 400 comprises a graphics processing unit (GPU). The PPU 400 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 400 can be configured to process the graphics primitives to generate a frame buffer (e.g., pixel data for each of the pixels of the display).

An application writes model data for a scene (e.g., a collection of vertices and attributes) to a memory such as a system memory or memory 404. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the multiprocessors 540 of the PPU 400 including one or more of a vertex shader, hull shader, domain shader, geometry shader, and a pixel shader. For example, one or more of the multiprocessors 540 may be configured to execute a vertex shader program that processes a number of vertices defined by the model data. In an embodiment, the different multiprocessors 540 may be configured to execute different shader programs concurrently. For example, a first subset of multiprocessors 540 may be configured to execute a vertex shader program while a second subset of multiprocessors 540 may be configured to execute a pixel shader program. The first subset of multiprocessors 540 processes vertex data to produce processed vertex data and writes the processed vertex data to the L2 cache 460 and/or the memory 404. After the processed vertex data is rasterized (e.g., transformed from three-dimensional data into two-dimensional data in screen space) to produce fragment data, the second subset of multiprocessors 540 executes a pixel shader to produce processed fragment data, which is then blended with other processed fragment data and written to the frame buffer in memory 404. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Figure 7:
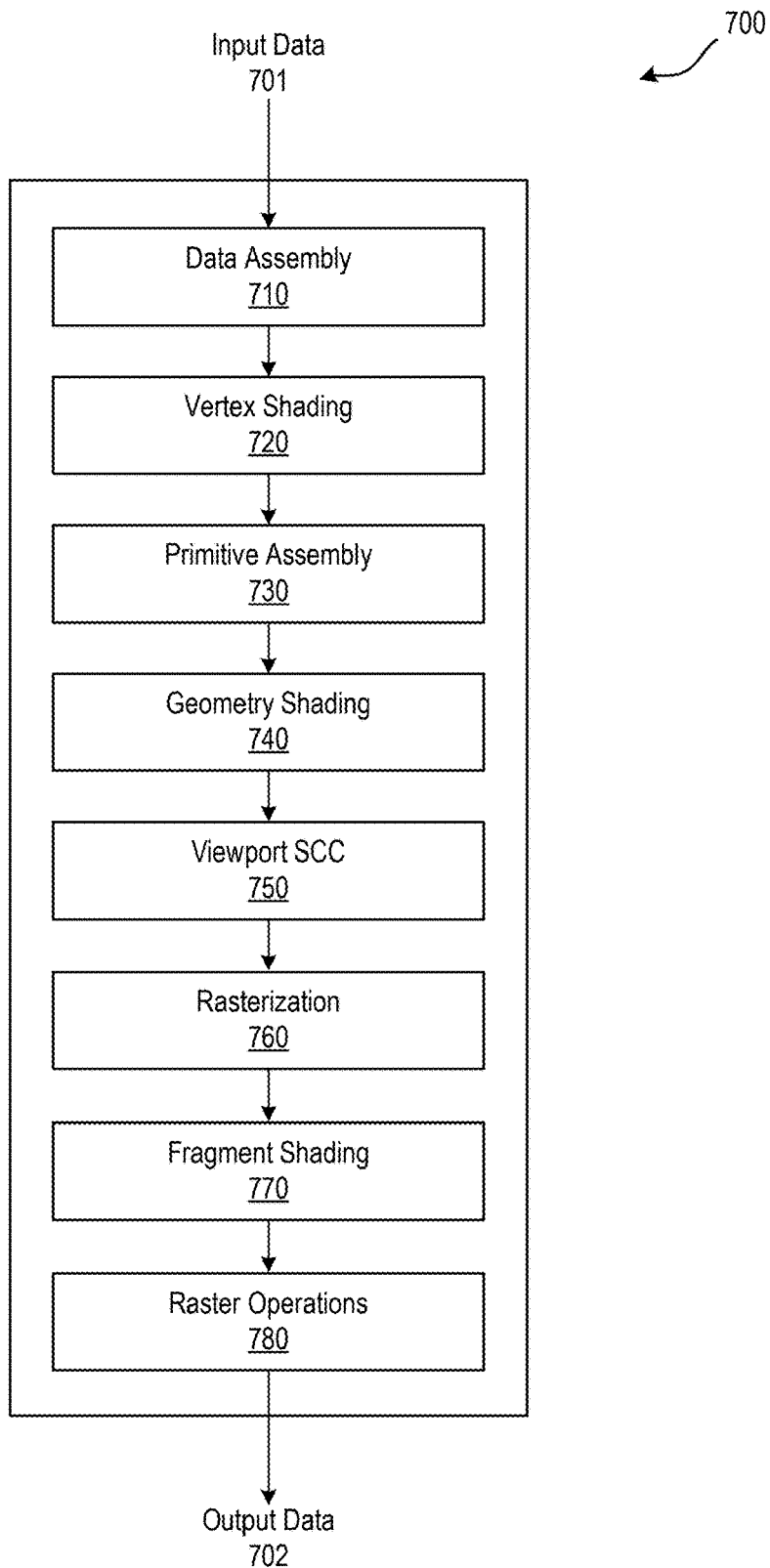
FIG. 7 is a conceptual diagram of a graphics processing pipeline implemented by the PPU of FIG. 4, with at least one embodiment of the present disclosure.

FIG. 7 is a conceptual diagram of a graphics processing pipeline 700 implemented by the PPU 400 of FIG. 4, in accordance with an embodiment. The graphics processing pipeline 700 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 700 receives input data 701 that is transmitted from one stage to the next stage of the graphics processing pipeline 700 to generate output data 702. In an embodiment, the graphics processing pipeline 700 may represent a graphics processing pipeline defined by the OpenGL® API. As an option, the graphics processing pipeline 700 may be implemented in the context of the functionality and architecture of the previous Figures and/or any subsequent Figure(s).

As shown in FIG. 7, the graphics processing pipeline 700 comprises a pipeline architecture that includes a number of stages. The stages include, but are not limited to, a data assembly stage 710, a vertex shading stage 720, a primitive assembly stage 730, a geometry shading stage 740, a viewport scale, cull, and clip (VSCC) stage 750, a rasterization stage 760, a fragment shading stage 770, and a raster operations stage 780. In an embodiment, the input data 701 comprises commands that configure the processing units to implement the stages of the graphics processing pipeline 700 and geometric primitives (e.g., points, lines, triangles, quads, triangle strips or fans, etc.) to be processed by the stages. The output data 702 may comprise pixel data (e.g., color data) that is copied into a frame buffer or other type of surface data structure in a memory.

The data assembly stage 710 receives the input data 701 that specifies vertex data for high-order surfaces, primitives, or the like. The data assembly stage 710 collects the vertex data in a temporary storage or queue, such as by receiving a command from the host processor that includes a pointer to a buffer in memory and reading the vertex data from the buffer. The vertex data is then transmitted to the vertex shading stage 720 for processing.

The vertex shading stage 720 processes vertex data by performing a set of operations (e.g., a vertex shader or a program) once for each of the vertices. Vertices may be, e.g., specified as a 4-coordinate vector (e.g., $<x, y, z, w>$) associated with one or more vertex attributes (e.g., color, texture coordinates, surface normal, etc.). The vertex shading stage 720 may manipulate individual vertex attributes such as position, color, texture coordinates, and the like. In other words, the vertex shading stage 720 performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 720 generates transformed vertex data that is transmitted to the primitive assembly stage 730.

The primitive assembly stage 730 collects vertices output by the vertex shading stage 720 and groups the vertices into geometric primitives for processing by the geometry shading stage 740. For example, the primitive assembly stage 730 may be configured to group every three consecutive vertices as a geometric primitive (e.g., a triangle) for transmission to the geometry shading stage 740. In some embodiments, specific vertices may be reused for consecutive geometric primitives (e.g., two consecutive triangles in a triangle strip may share two vertices). The primitive assembly stage 730 transmits geometric primitives (e.g., a collection of associated vertices) to the geometry shading stage 740.

The geometry shading stage 740 processes geometric primitives by performing a set of operations (e.g., a geometry shader or program) on the geometric primitives. Tessellation operations may generate one or more geometric primitives from each geometric primitive. In other words, the geometry shading stage 740 may subdivide each geometric primitive into a finer mesh of two or more geometric primitives for processing by the rest of the graphics processing pipeline 700. The geometry shading stage 740 transmits geometric primitives to the viewport SCC stage 750.

In an embodiment, the graphics processing pipeline 700 may operate within a multiprocessor and the vertex shading stage 720, the primitive assembly stage 730, the geometry shading stage 740, the fragment shading stage 770, and/or hardware/software associated therewith, may sequentially perform processing operations. Once the sequential processing operations are complete, in an embodiment, the viewport SCC stage 750 may utilize the data. In an embodiment, primitive data processed by one or more of the stages in the graphics processing pipeline 700 may be written to a cache (e.g., L1 cache, a vertex cache, etc.). In this case, in an embodiment, the viewport SCC stage 750 may access the data in the cache. In an embodiment, the viewport SCC stage 750 and the rasterization stage 760 are implemented as fixed function circuitry.

The viewport SCC stage 750 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization stage 760.

The rasterization stage 760 converts the 3D geometric primitives into 2D fragments (e.g., capable of being utilized for display, etc.). The rasterization stage 760 may be configured to utilize the vertices of the geometric primitives to set up a set of plane equations from which various attributes can be interpolated. The rasterization stage 760 may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization stage 760 generates fragment data (e.g., interpolated vertex attributes associated with a particular sample location for each covered pixel) that are transmitted to the fragment shading stage 770.

The fragment shading stage 770 processes fragment data by performing a set of operations (e.g., a fragment shader or a program) on each of the fragments. The fragment shading stage 770 may generate pixel data (e.g., color values) for the fragment such as by performing lighting operations or sampling texture maps using interpolated texture coordinates for the fragment. The fragment shading stage 770 generates pixel data that is transmitted to the raster operations stage 780.

The raster operations stage 780 may perform various operations on the pixel data such as performing alpha tests, stencil tests, and blending the pixel data with other pixel data corresponding to other fragments associated with the pixel. When the raster operations stage 780 has finished processing the pixel data (e.g., the output data 702), the pixel data may be written to a render target such as a frame buffer, a color buffer, or the like.

It will be appreciated that one or more additional stages may be included in the graphics processing pipeline 700 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 740). Other types of graphics processing pipelines are contemplated as being within the scope of the present disclosure. Furthermore, any of the stages of the graphics processing pipeline 700 may be implemented by one or more dedicated hardware units within a graphics processor such as PPU 400. Other stages of the graphics processing pipeline 700 may be implemented by programmable hardware units such as the multiprocessors 540 of the PPU 400.

The graphics processing pipeline 700 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 400. The API provides an abstraction for a programmer that lets a programmer utilize specialized graphics hardware, such as the PPU 400, to generate the graphical data without requiring the programmer to utilize the specific instruction set for the PPU 400. The application may include an API call that is routed to the device driver for the PPU 400. The device driver interprets the API call and performs various operations to respond to the API call. In some instances, the device driver may perform operations by executing instructions on the CPU. In other instances, the device driver may perform operations, at least in part, by launching operations on the PPU 400 utilizing an input/output interface between the CPU and the PPU 400. In an embodiment, the device driver is configured to implement the graphics processing pipeline 700 utilizing the hardware of the PPU 400.

Various programs may be executed within the PPU 400 in order to implement the various stages of the graphics processing pipeline 700. For example, the device driver may launch a kernel on the PPU 400 to perform the vertex shading stage 720 on one multiprocessors 540 (or multiple multiprocessors 540). The device driver (or the initial kernel executed by the PPU 400) may also launch other kernels on the PPU 400 to perform other stages of the graphics processing pipeline 700, such as the geometry shading stage 740 and the fragment shading stage 770. In addition, some of the stages of the graphics processing pipeline 700 may be implemented on fixed unit hardware such as a rasterizer or a data assembler implemented within the PPU 400. It will be appreciated that results from one kernel may be processed by one or more intervening fixed function hardware units before being processed by a subsequent kernel on an multiprocessors 540.

Machine Learning

Deep neural networks (DNNs) developed on processors, such as the PPU 400 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 400. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 400 is a computing platform capable of delivering performance required for deep neural network-based artificial intelligence and machine learning applications.

What is claimed is:

1. A system comprising:
   a processing device including a first cache;
   a system memory, operatively coupled with the processing device; and
   a parallel processing unit (PPU), operatively coupled with the processing device, wherein the PPU includes a second cache, and wherein the PPU is to:
      receive a cache operation to modify cache lines of the second cache associated with a first aperture of the system memory; and
      identify a first subset of cache lines of the second cache, wherein the first subset of cache lines is associated with the first aperture of the system memory;
      identify a second subset of cache lines of the second cache, wherein the second subset of cache lines is associated with a second aperture of the system memory; and
      modify the first subset of cache lines as specified by the cache operation.

2. The system of claim 1, wherein the cache operation in an invalidate operation, and wherein to modify the first subset of caches lines, the PPU is to:
   write data stored at the first subset of cache lines back to the first cache; and
   invalidate the first subset of cache lines.

3. The system of claim 1, wherein the cache operation in a flush operation, and wherein to modify the first subset of cache lines, PPU is to:
   write data store at the first subset of cache lines back to the first cache; and
   maintain a clean state of the first subset of cache lines.

4. The system of claim 1, wherein the first aperture is a non-coherent aperture of the system memory, and the second aperture is a coherent aperture of the system memory.

5. The system of claim 1, wherein the PPU is further to:
   cause the second subset of cache lines to be maintained within the second cache.

6. The system of claim 1, wherein the first subset of cache lines and the second subset of cache lines are identified based on identifiers associated with a non-coherent system memory aperture and a coherent system memory aperture, respectively.

7. The system of claim 1, wherein the PPU and the processing device are interconnected via an interface using a common hardware interface (CHI) protocol.

8. The system of claim 1, wherein the first subset of cache lines can further be differentiated and invalidated based on a process identifier that indicates one of a plurality of processes associated with the processing device.

9. The system of claim 1, wherein coherency of the second subset of cache lines is managed by hardware associated with the processing device.

10. A method comprising:
    receiving, at a parallel processing unit (PPU) including a first cache, a cache operation to modify cache lines of the first cache associated with a first aperture of a system memory of a processing device;
    identifying a first subset of cache lines of the first cache, wherein the first subset of cache lines is associated with the first aperture of the system memory;
    identifying a second subset of cache lines of the first cache, wherein the second subset of cache lines is associated with a second aperture of the system memory; and
    modifying the first subset of cache lines as specified by the cache operation.

11. The method of claim 10, wherein the cache operation is an invalidate operation, and wherein modifying the first subset of cache lines comprises:
    writing data stored at the first subset of cache lines back to a second cache of the processing device; and
    invalidating the first subset of cache lines.

12. The method of claim 10, wherein the cache operation is a flush operation, and wherein modifying the first subset of cache lines comprises:
    writing data stored at the first subset of cache lines back to a second cache of the processing device; and
    maintaining a clean state of the first subset of cache lines.

13. The method of claim 10, wherein the first aperture is a non-coherent aperture of the system memory, and the second aperture is a coherent aperture of the system memory.

14. The method of claim 10, further comprising:
    causing the second subset of cache lines to be maintained within the first cache.

15. The method of claim 10, wherein the first subset of cache lines and the second subset of cache lines are identified based on identifiers associated with a non-coherent aperture and a coherent aperture, respectively.

16. The method of claim 10, wherein the PPU and the processing device are interconnected via an interface using a common hardware interface (CHI) protocol.

17. The method of claim 10, wherein the first subset of cache lines can further be differentiated and invalidated based on a process identifier that indicates one of a plurality of processes associated with the processing device.

18. The method of claim 10, wherein coherency of the second subset of cache lines is managed by hardware associated with the processing device.

19. One or more processors comprising processing circuitry to:
- receive, at a parallel processing unit (PPU) including a first cache, a cache operation to modify cache lines of the first cache associated with a first aperture of a system memory of a processing device;
- identify a first subset of cache lines of the first cache, wherein the first subset of cache lines is associated with the first aperture of the system memory;
- identify a second subset of cache lines of the first cache, wherein the second subset of cache lines is associated with a second aperture of the system memory; and
- modify the first subset of cache lines as specified by the cache operation.

20. The one or more processors of claim 19, wherein the cache operation is an invalidate operation, and wherein to modify the first subset of cache lines, the processing circuitry is to:
- write data stored at the first subset of cache lines back to a second cache of the processing device; and
- invalidate the first subset of cache lines as invalid.

* * * * *